Aug. 7, 1962 W. F. BILLINGER 3,047,953
AUTOMOTIVE GLASS CUTTING MACHINES
Filed Dec. 3, 1958 2 Sheets-Sheet 1

INVENTOR.
William F. Billinger
BY William D. Jaspert
Attorney.

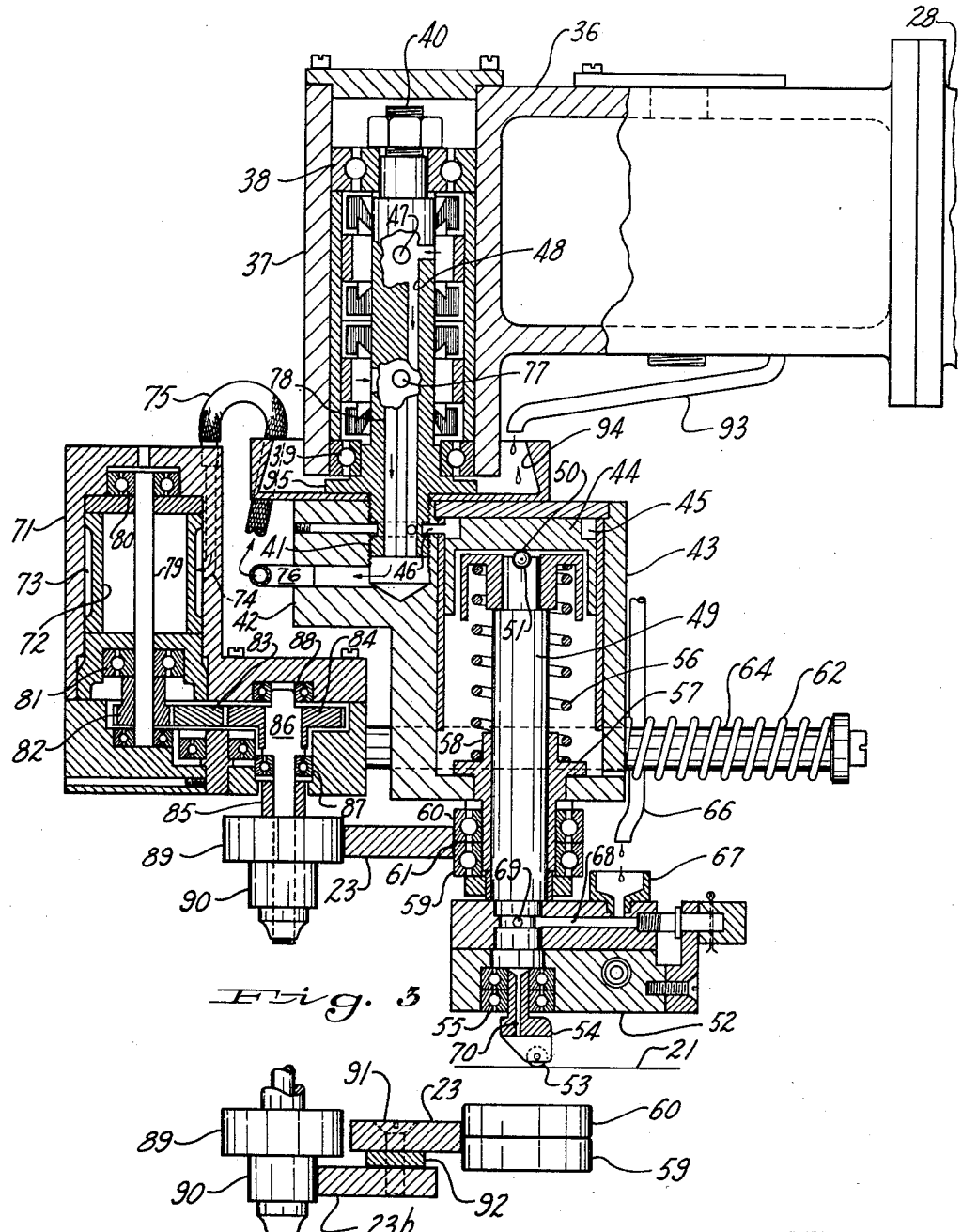

United States Patent Office 3,047,953
Patented Aug. 7, 1962

3,047,953
AUTOMOTIVE GLASS CUTTING MACHINES
William F. Billinger, Grandview Blvd., Zelienople, Pa.
Filed Dec. 3, 1958, Ser. No. 777,970
6 Claims. (Cl. 33—27)

This invention relates to new and useful improvements in glass cutting apparatus, especially adapted for use by the automotive industry in cutting out the glass for doors, windshields and the like, and it is among the objects thereof to provide an air driven cutting head which shall automatically cut out plate or sheet glass to the desired shape and size as determined by a template by means of which the cutting head movement is controlled.

It is a further object of this invention to provide a self-contained pneumatically driven cutting head for glass cutting machinery.

It is still a further object of the invention to provide a template for use with air driven cutting heads for glass cutting machines in which the corner or curved portions are provided with a special or auxiliary cam track that is engaged by the drive wheel to regulate the speed of travel of the cutting head over the template surfaces.

The invention will become more apparent from a consideration of the accompanying drawings constituting a part hereof in which like reference characters designate like parts and in which:

FIGURE 3 is a vertical cross section through the cutting head and drive; and,

FIGURE 4 is a vertical cross section through a curved portion of the template showing the drive and guide rollers in side elevation.

Figure 2:
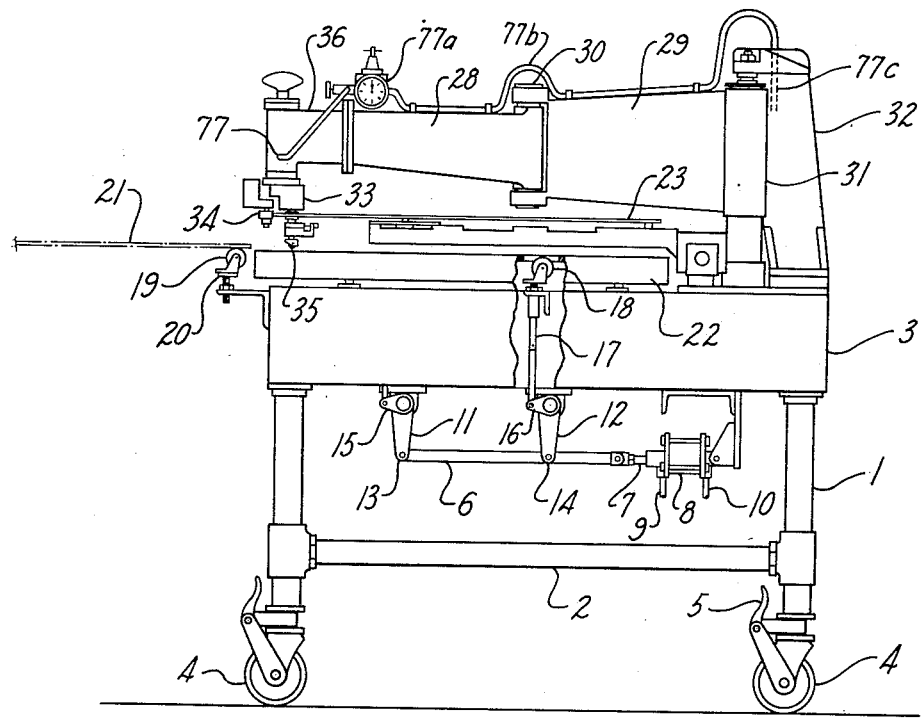
FIGURE 2 is an end elevational view taken along the line 2—2, FIGURE 1.
Figure 1:
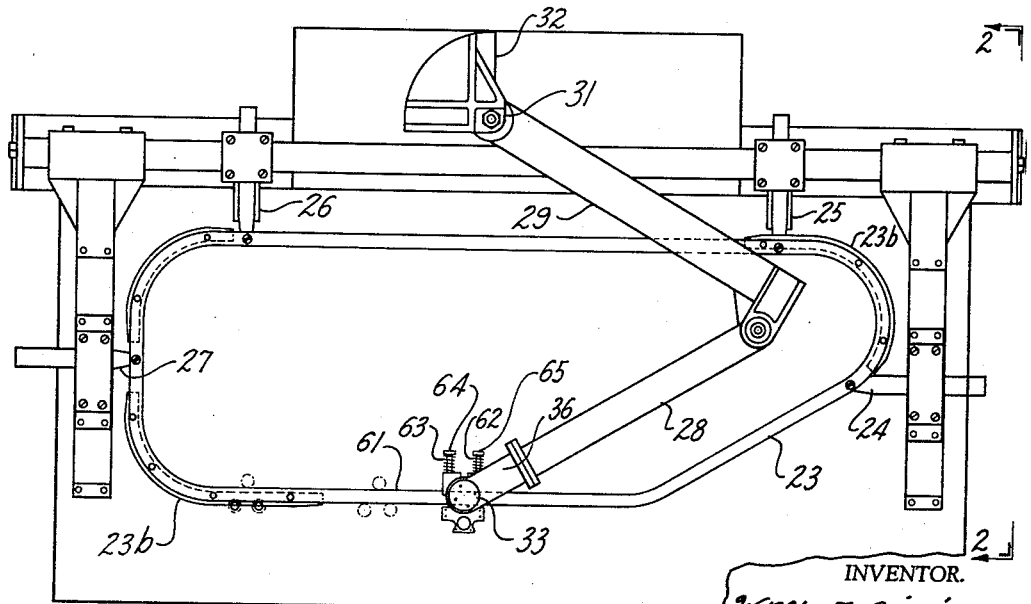
FIGURE 1 is a top plan view of an automatic air driven glass cutting machine embodying the principles of this invention.

With reference to FIGURES 1 and 2 of the drawing, the numeral 1 designates uprights or standards having cross bars 2 to constitute the supporting frame of a base 3, casters 4 being provided to render it mobile. Levers 5 on the casters lock the caster wheels or release them for movement as the case may be.

Mounted underneath the base 3 is a rod 6 connected at one end to the piston rod 7 of a pneumatic cylinder 8 having connections 9 and 10 with a source of air pressure. Levers 11 and 12 are pivotally connected to rod 6 at 13 and 14 and are provided with lever arms 15 and 16, respectively, to constitute bell crank levers that operate rods 17 for raising and lowering rollers 18. A guide roller 19 is mounted on a swivel 20 at the front of the table 3 to support a sheet or plate of glass 21 that is fed to the tables and onto the rollers 18. When the plate has been moved to position on the base 3, the rollers 8 are lowered and the plate glass 21 rests on a cutting table 22, FIGURE 2.

Supported on the base 3 is a template 23, FIGURES 1 and 2, the template being secured by arms 24, 25, 26 and 27.

Above the template 23 is a joint arm consisting of parts 28 and 29 pivoted at 30 and hingedly mounted at 31 to an upright or bracket 32 extending from the base 3.

The arm 29 carries the automatic air driven cutting head generally designated by the numeral 33, which has a drive generally designated by the numeral 34 that engages the periphery of the template 23 to guide the cutting head in its cutting movement with the glass cutting wheel 35, FIGURE 2, in contact with the plate glass 21 to cut it to the proper shape and size. The pivotally mounted jointed arm and the swivel mounted cutting head and drive motor provide freedom of movement for the cutting head in following the edge of the template 23.

The cutting head and pneumatic drive is shown in detail in FIGS. 3 and 4 of the drawing in which the hinged arm portion 28 is shown provided with an extension 36 from which is suspended a cylinder 37 having a pair of ball bearings 38 and 39 for journaling a swivel pin 40, the bottom of which is provided with a threaded portion 41 for threadingly engaging the body portion 42 of the cutter head. The cutter head is provided with a cylinder 43 in which is mounted a piston 44 having air connections through an annular recess 45 with a duct 46 leading to a source of air pressure 47 through a duct 48. Disposed within cylinder 43 is a cutting head spindle 49 having point contact at 50 with the piston 44 through a sphere or ball 51 that is seated in the end of the square stem 49. The cutting head 52 carries a cutting wheel 53 mounted on a self-guiding swivel 54 journaled in ball bearings 55 and is attached to the square stem 49. The cutting head is held in its normal raised position by a coil spring 56 that rests upon the flange 57 of an internally square bushing 58 that is provided with roller bearings 59 and 60 that constitute guides for the cutting head as it traverses the inner face 61 of the template 23, contact of the roller bearing guides with the template face being maintained by pressure of coil springs 62 and 63 on guide rods 64 and 65.

The cutting wheel 53 is provided with a lubricant such as kerosene from a supply line 66 having a valve, not shown, for regulating the flow into a funnel shaped receiver 67 having a passage leading to the passage 68 from which it flows into an opening 69 of a hollow spindle that communicates with the flow passage 70 of the shank of the swivel 54, the flow from passage 70 being in the path of the cutting wheel 53.

The cutting head 52 is moved around the template 23 by a pneumatically operated drive motor generally designated by the numeral 71, FIGURE 3. The rotor 72 of the motor is provided with vanes 73 to which compressed air is supplied through a duct shown in dotted lines at 74 that is connected by a flexible hose 75 with the conduit 76 that leads to an air inlet 77 through the duct 78. A pressure gauge 77a is provided in the air line 77b connecting the inlet 77 and leading to a compressor at 77c, FIGURE 2. The rotor 72 is provided with a shaft 79 journaled in ball bearings 80 and 81, the shaft 79 being provided with a pinion 82 that engages an idler 83 having gear tooth connection with a gear wheel 84.

A hollow drive spindle 85 is mounted on shaft 86 driven by the gear wheel 84, the shaft being journaled in ball bearings 87 and 88. The drive spindle 85 is provided with a pair of friction rollers or drive wheels 89 and 90 of different diameters, the friction wheel 89 being in alignment with the main body of the template 23 and as shown in FIGURE 4, the small diameter drive wheel 90 engages the extension 23b of the template which is secured to the template 23 by screws 91 extending through a spacer 92, as shown in FIGURE 4. The drive motor and drive wheels are secured to the rods 64 and 65 of the cutting head, as is shown in FIGURES 1 and 3, and the tension of the coil springs 62 and 63 draws the drive wheels or rollers 89 and 90 against the template 23, as is shown in FIGURES 3 and 4 conversely, the resilient contact of the drive wheels 89 and 90 with the template 23 and the extension 23b causes the roller bearings 59 and 60 to contact the inner face of the template as shown in FIGURES 3 and 4. As shown in FIGURE 3, the cutting head is kept in a free rotating condition by lubrication supplied through a steel spout 93 which delivers the lubricant to a cup-like chamber 94 in which the flange 95 of the swivel pin 40 is seated.

The operation of the above-described glass cutting apparatus is briefly as follows:

With the glass 21 in position on the cutting support 22, pressure from the source 48 to the annular chamber 45 above the piston 44 will cause the latter to move downward against tension of the spring 56 to bring the cutting wheel 53 in pressure contact with the surface of the glass sheet or plate 21. By virtue of the ball contact 50 with the cutting head piston 44, any misalignment between piston 44 and stem guide 57 is compensated for and the swivel head 54 that carries the cutting wheel 53 is freely movable to maintain cutting alignment of wheel 53 in the direction of travel of the cutting head.

When air is supplied through the flexible hose connection 75 from the source 77 to the pneumatically operated motor, rotor 72 will revolve turning shaft 79 and through gear wheels 83 and 84 rotating the drive spindle 85. By virtue of the resilient connection of the drive motor with the cutting head through the rod 64 and 65 and the coil spring 62 and 63, anti-friction roller 59 and 60 will engage the inside track or face of the template 23 and the drive roll 89 will engage the outer track or face of the template 23.

Rotation of the friction wheel 89 will cause the cutting head to follow the contour of the template and cut the glass to the shape of the template.

When the drive wheel passes over the extended portions 23b of the template 23, the small drive roll or wheel 90 will engage the extension 23b to slow up the travel of the cutting head in proportion to the ratio of wheel diameter of the wheels 89 and 90. This results in a more controlled cutting action, as the cutting wheel defines a cutting path corresponding to the curvature of the template.

By means of the above-described automatic glass cutting head and pneumatic drive mechanism, plate or sheet glass may be speedily cut to proper size and shape without breakage and the cutting operation, including the feeding of the glass to and from the cutting support, may be fully automatic.

Although one embodiment of the invention has been herein illustrated and described, it will be evident to those skilled in the art that various modifications may be made in the details of construction without departing from the principles herein set forth.

I claim:

1. Glass cutting apparatus having a support for sheet glass, a template of the shape of the glass to be cut spaced above said support, a swinging arm above said sheet glass support and template having a cutting unit suspended therefrom with rollers contacting said template to follow the contour thereof in its cutting movement, said cutting unit being pivotally mounted on said swinging arm and having a swivel pin for supporting a cutting head at one end and a piston at the other, said cutting head having a guide roller for engaging one side of said template and said piston communicating with a source of fluid pressure, said cutting unit including a drive motor mounted to be yieldingly biased in the direction of the template and having a drive spindle with a friction wheel engaging the side of said template opposite the guide roller for propelling the cutting unit around the template, said drive motor having a fluid driven rotor geared to said drive spindle.

2. Glass cutting apparatus as set forth in claim 1, in which the cutting unit housing is suspended from a pivot pin mounted in anti-friction bearings supported in the swinging arm, said pivot pin having a fluid chamber connected to a fluid pressure source and to the piston at one end of the swivel pin and from the fluid source to the rotor of the drive motor.

3. Glass cutting apparatus as set forth in claim 1, in which one end of the swivel pin is provided with a cutter head having a self-guiding swivel with a hollow shaft and means in said cutting head for continuously supplying a cutting lubricant to the cutting wheel through said hollow shaft.

4. Glass cutting apparatus as set forth in claim 1, in which the drive spindle is provided with a pair of rollers of different diameters for engaging offset faces of said template to provide a controlled rate of travel for said head.

5. Glass cutting apparatus as set forth in claim 1, in which the template has offset faces at the curved portions thereof and in which the drive spindle is provided with a pair of rollers of different diameters, the small diameter of which engages the offset face of the template to provide a controlled rate of travel for the cutting head.

6. Glass cutting apparatus as set forth in claim 1, in which the swivel pin is provided with a ball bearing at the top thereof for engaging the piston and is further provided with spring means to urge the swivel pin against said ball bearing.

References Cited in the file of this patent

UNITED STATES PATENTS

| | | |
|---|---|---|
| 1,582,033 | Godfrey | Apr. 27, 1926 |
| 2,375,378 | Morris | May 8, 1945 |
| 2,595,402 | Morris | May 6, 1952 |
| 2,932,087 | Morris et al. | Apr. 12, 1960 |
| 2,943,393 | Insolio | July 5, 1960 |